United States Patent [19] [11] Patent Number: 5,014,250
Hadderingh [45] Date of Patent: May 7, 1991

[54] ACOUSTIC DETECTION DEVICE

[75] Inventor: Johannes N. Hadderingh, Goor, Netherlands

[73] Assignee: Hollandse Signaalapparaten B. V., Hengelo, Netherlands

[21] Appl. No.: 509,254

[22] Filed: Apr. 13, 1990

[30] Foreign Application Priority Data

Apr. 20, 1989 [NL] Netherlands ............... 8900985

[51] Int. Cl.$^5$ ........................................ G01S 3/80
[52] U.S. Cl. ........................................ 367/124
[58] Field of Search ............... 367/118, 119, 121, 124, 367/129

[56] References Cited

U.S. PATENT DOCUMENTS 4,207,624 6/1980 Dentino et al. ............... 367/901
4,754,282 6/1988 Edelblute et al. ............... 367/100

Primary Examiner—Thomas H. Tarcza
Assistant Examiner—Daniel T. Pihulic
Attorney, Agent, or Firm—Robert J. Kraus

[57] ABSTRACT

A sonar system has k acoustic detectors (1) for the detection and conversion of acoustic signals into electrical signals s(k), a beamforming unit (3), a frequency analysis unit (4), which uses the signals s(k) to generate signals s($\phi_i$, $f_j$), representing acoustic signals with n frequencies $f_j$ (j=1 ... n) received from m beam reception directions $\phi_i$ (i=1 ... m), and a data processing unit (5). The data processing unit (5) comprises a direction estimator unit (6) which generates, for each of the n frequencies $f_j$ on the basis of at least a selection of the signals s($\phi_i$,$f_j$), a narrowband estimator $\Omega_{NB}(f_j)$ of a direction $\Omega$ of an acoustic source, and subsequently on a selection of these $\Omega_{NB}(f_j)$ a broadband estimator $\Omega_{BB}$.

15 Claims, 4 Drawing Sheets

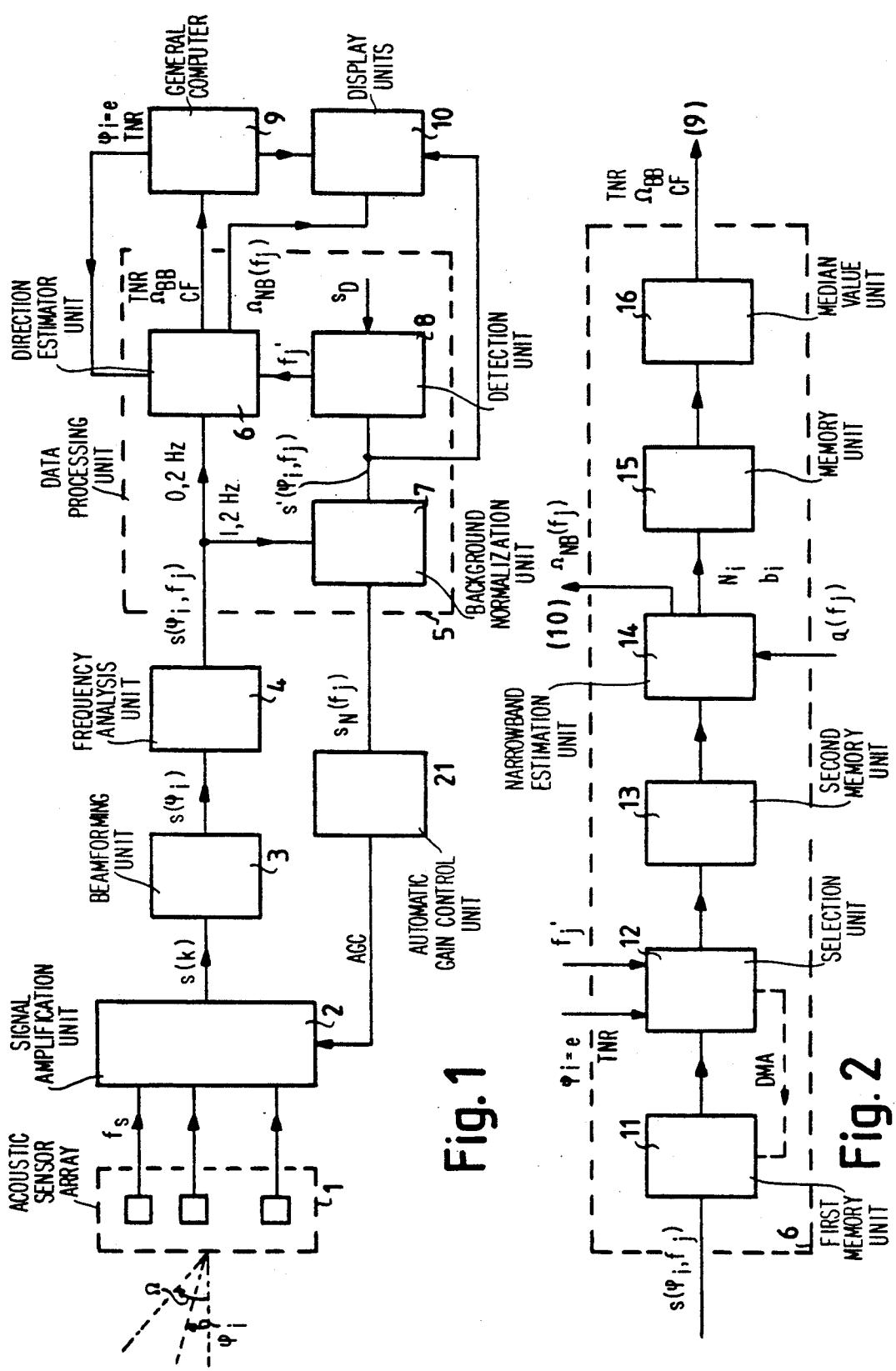

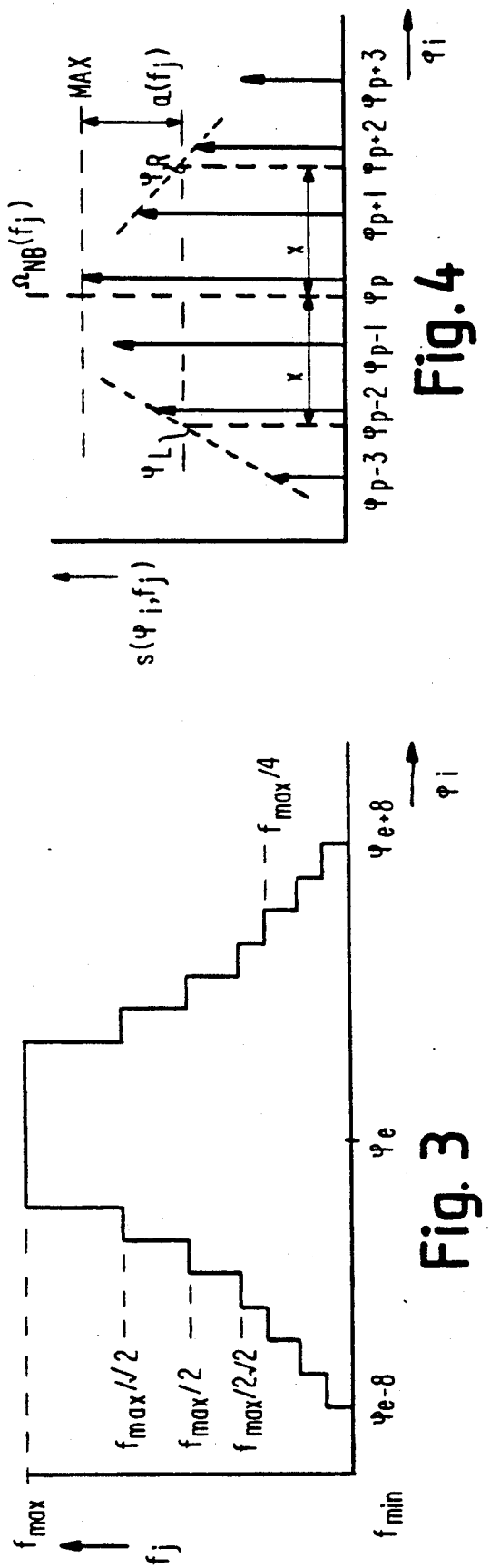
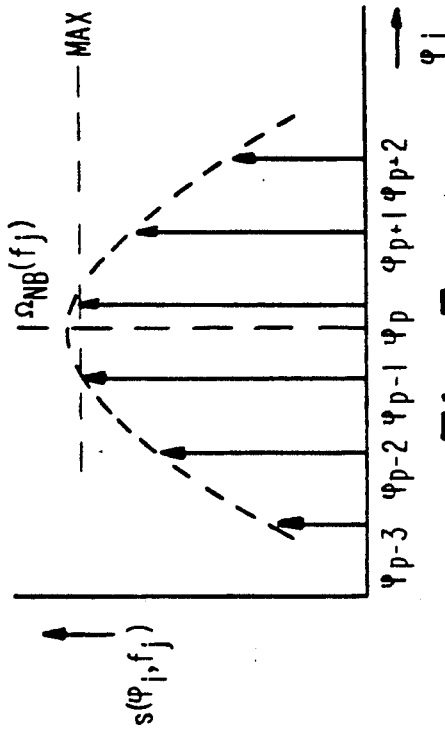
Fig. 4
Fig. 3
Fig. 5

ACOUSTIC DETECTION DEVICE

BACKGROUND OF THE INVENTION

The invention relates to an acoustic detection device for receiving and processing acoustic signals, which comprises:
- k acoustic detectors for the detection and conversion of acoustic signals into electrical signals s(k);
- beamforming means and a frequency analysis unit which uses the signals s(k) to generate signals $s(\phi_i, f_j)$ which represent acoustic signals with n frequencies $f_j$ (j=1 ... n) received from m beam reception directions $\phi_i$ (i=1 ... m);
- a data processing unit suitable for processing the signals $s(\phi_i, f_j)$.

The invention also relates to a data processing unit, a background normalisation unit, a direction estimator unit and an automatic gain control unit suited to be used in such an acoustic detection device.

A device of the type mentioned above is known from U.S. Pat. No. 4,207,624. It describes a sonar apparatus suitable for the detection of sonar signals. For this purpose the instrument is provided with various acoustic detectors embodied by hydrophones, a beamformer connected to them and a frequency analysis unit which is connected to the beamformer and operates according to with the FFT principle. The digitised signals obtained for each beam direction in a frequency domain by the frequency analysis unit are subsequently presented to the data processing unit. The data processing unit comprises for each beam direction and each frequency component a filter which filters, the signals supplied successively to the filter, with respect to time. Signals that are stationary in time, are transferred in an amplified way compared to non-stationary signals in time. This is achieved by multiplying each digitised signal by a complex number which is determined adaptively in a feedback loop. This results in an improved signal-to-noise ratio as non-stationary noise in time is attenuated.

A disadvantage of this filtering process is that background and interference signals stationary in time are not attenuated, while components of a target signal which are not stationary in time are attenuated.

Furthermore, the way an accurate estimation of a direction of a received target echo can be determined and a target can be tracked is not disclosed for the device mentioned.

It is generally known that the estimation of a direction, by means of interpolation, on the basis of signals received in different and adjacent beam directions, is many times more accurate than one beamwidth. The signal thus obtained for each beam direction can represent either a broad frequency range or a narrow frequency range. The former instance is called a "broadband" estimation and the latter a "narrowband" estimation of the direction.

A disadvantage inherent to broadband estimations is that when a high background level occurs at low frequencies and target signals occur at high frequencies, the target signal contributes relatively little to the sum signal. Particularly in the case of low frequencies, high background levels will occur due to the better propagation characteristics of sonar signals at low frequencies. However, a well-known solution to this problem is to apply a so-called fixed pre-whitening filter, which "whitens" the frequency spectrum. This does not work optimally for background levels whose frequency dependence varies across the time. An additional disadvantage of broadband estimations is the sensitivity to interference signals, resulting from the large bandwidth.

Narrowband estimations, however, only work optimally if the target signal has striking fixed frequency components which can be tracked. If these are lacking or change frequency, narrowband estimations are no longer optimal. Besides, interference signals present in the frequency band used, can affect the measurement, especially in case of broadband interference.

SUMMARY OF THE INVENTION

An object of the invention is to provide a device which is not impaired by the drawbacks described. To that end the device is characterised in that it features a data processing unit comprising a direction estimator unit which generates for each of the n frequencies $f_j$ (j=1 ... n), where the detection criterion set by the direction estimator unit is met, on the basis of at least a selection of the signals $s(\phi_i, f_j)$ (i=1 ... m), corresponding to each frequency $f_j$ from the beam reception directions $\phi_i$, a narrowband estimation $\Omega_{NB}(f_j)$ of a direction $\Omega$ of an acoustic signals generating source and where subsequently the direction estimator unit, on the basis of the narrowband estimations $\Omega_{NB}(f_j)$, generated for at least a selection of the frequencies $f_j$, generates a broadband estimation $\Omega_{BB}$ of the direction $\Omega$.

Instead of making one narrowband estimation on the basis of signals from one single broad or narrow frequency band; on the basis of signals from a large number of frequencies, a corresponding number of narrowband estimations are carried out. Subsequently, on the basis of the number of narrowband estimations obtained, an ultimate estimation is made which results in the signals being filtered with respect to the direction instead of to time. Therefore, the target signals which are not stationary in time are not suppressed, while the background signals which are stationary in time are suppressed. The fact of the matter is that target signals are always correlated in direction. The susceptibility to interference is greatly reduced as it can be suppressed on the basis of directional information. Optimum use is made of available target signals and possibly of target signals varying in frequency, as for each frequency any signal meeting the detection criterion is included.

An embodiment of the device according to the invention is characterised in that $\Omega_{BB}$ is obtained on the basis of a median value of a frequency range of the values $\Omega_{NB}(f_j)$ arranged in order of magnitude. The advantage of a median estimation is that interference signals, which appear as peaks in the frequency range, have little influence on the median value. This in contrast with average values.

A confidence factor for $\Omega_{BB}$ can be obtained on the basis of a distribution of the values $\Omega_{NB}(f_j)$ around the median value in the frequency range of $\Omega_{NB}(f_j)$.

If the accuracy of the estimations $\Omega_{NB}(f_j)$ is low due to a low signal-to-noise ratio or because of interference with jamming signals or other target signals, a factor is thus obtained for the reliability of an estimation $\Omega_{BB}$ of the target direction $\Omega$.

The data processing unit should preferably comprise a background normalisation unit that generates for each of the n frequencies $f_j$ (j=1 ... n), on the basis of the m signals $s(\phi_i, f_j)$ from m beam reception directions $\phi_i$ (i=1 ... m) belonging to each frequency $f_j$, a background signal $s_N(f_j)$, and subtracts the signals $s_N(f_j)$ from the signals $s(\phi_i, f_j)$ in accordance with $s'(\phi_i, f_j) = s(\phi_i, f_j) - s_N(f_j)$ (i = 1 ... m, j = 1 ... n). By making a correction, for all frequencies and per frequency, to the signals for the frequency in question, where the magnitude of the correction is determined by the magnitude of the signals across all directions for this frequency, a "white" frequency spectrum is achieved, thus making a "pre-whitening" filter unnecessary. The correction represents the angle-correlated background signal and consequently comprises both background signals which are stationary in time and background signals which are not stationary in time.

Besides, it is possible to provide the direction estimator unit with a detection unit which, on the basis of the signals $s'(\phi_i, f_j)$ supplied to the detection unit and with the aid of a set signal detection level $s_D$, selects signals with frequencies $f_j'$ for which applies that the corresponding signal $s'(\phi_i, f_j')$ exceeds detection level $s_D$. The advantage thereof is that the direction estimator unit is limited to generating estimations for those signals that exceed the detection threshold so that the computer is not unnecessarily loaded. This also excludes poor quality measurements.

Another feasible embodiment of the device is characterised in that the estimation of $\Omega_{NB}(f_j)$ is obtained on the basis of signals $s(\phi_i, f_j'')$, selected according to frequency $f_j''$, where a maximally occurring value of the frequency $f_j''$ becomes increasingly smaller as the beam direction $\phi_i$ differs more and more from a beam direction $\phi_{i=e}$ which most resembles $\Omega$. This is based on the fact that the beamwidth is inversely proportional to the frequency $f_j$ for which the beamwidth has been defined. In case of high frequencies the beamwidths are narrow and consequently the directional information accurate. Furthermore, the signals are generally weaker at high frequencies than at low frequencies. Therefore, the high frequencies of a target signal in the beam direction $\phi_e$ will only occur in the beam directions most adjacent. The lower frequencies will, however, also occur in more remote beam directions. By including only those frequencies for the adjacent beam directions, which are expected to still provide target signals in the beam direction, optimum use is made of the better directional accuracy at high frequencies.

If $\phi_i$, by means of a transformation function, represents an angle related to the beam reception direction $\phi_i$, where a beamwidth expressed in $\phi_i$ is virtually independent of a magnitude of the angle and a beamform, determined by a beam sensitivity as a function of $\phi_i$, is of a virtually symmetric form, the advantage is that the beamwidth and form are independent of the magnitude of $\phi_i$. This allows the procedure for directional estimations to be kept fairly simple.

A favourable embodiment of the device is furthermore characterised in that it comprises an automatic gain control unit, which generates an automatic gain control (AGC) signal on the basis of the background signals $S_N(f_j)$ generated per frequency $f_j$ (j = 1 ... n) and where the AGC signal is supplied to the signal amplification means, connected with the acoustic detectors. By basing the signal amplification on the magnitude of the background signal, the dynamic range of the signal amplification chain can be kept limited.

Another favourable embodiment is further characterised in that the signals $s'(\phi_i, f_j)$ are supplied to a display unit suitable for display of $s'(\phi_i, f_j)$ as a function of one or more of the quantities $\phi_i$, $f_j$ and an elapsed period of time. As it has been corrected for the background level, optimum use can be made of a dynamic range of the display unit.

BRIEF DESCRIPTION OF THE DRAWING

The invention will further be described by means of the following figures, of which FIG. 1 illustrates an embodiment of an acoustic detection device with a data processing unit comprising a direction estimator unit and a background normalisation unit;

FIG. 2 illustrates an embodiment of the direction estimator of FIG. 1;

FIG. 3 shows an illustration of frequency selection by the direction estimator unit of FIG. 2;

FIG. 4 illustrates a narrowband estimation $\Omega_{NB}(f_j)$ by the direction estimator unit of FIG. 2 on the basis of a symmetry method;

FIG. 5 illustrates a narrowband estimation $\Omega_{NB}(f_j)$ by the direction estimator unit of FIG. 2 on the basis of a polynomial fit;

DESCRIPTION OF THE PREFERRED EMBODIMENTS

Figure 6:
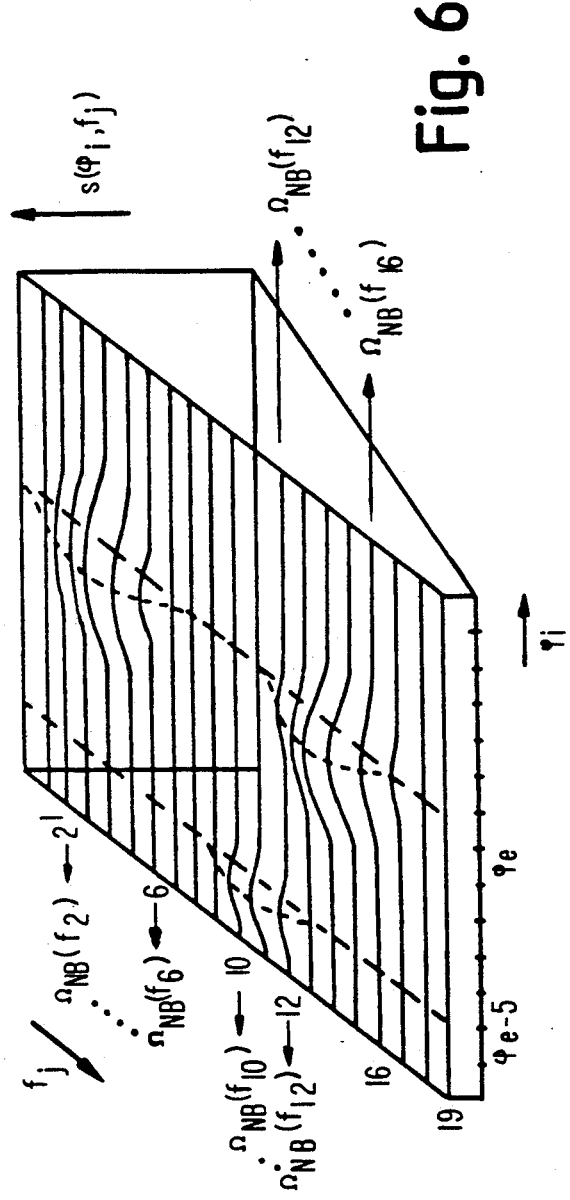
FIG. 6 gives a typical example of the values $s(\phi_i, f_j)$ and the corresponding feasible narrowband estimations $\Omega_{NB}(f_j)$.

The embodiment of an acoustic detection device shown in FIG. 1 relates to a passive sonar apparatus. It comprises an array 1 with acoustic sensors embodied by hyrophones which are suitable for converting acoustic signals into electrical signals. The hydrophones are arranged in a cylindrical array of 96 rows parallel to the cylinder axis, each row comprising four hydrophones. The hydrophones are optimally sensitive to acoustic signals with frequencies of 0.9 kHz to 10 kHz.

Obviously other configurations are also feasible, such as for instance arrangement in a linear array and a 90–1000 Hz frequency range.

The hydrophones are connected with a signal amplification unit 2 which scans each row of hydrophones by means of a practical scanning frequency of $f_s = 30$ kHz. The choice of the scanning frequency $f_s$ is, amongst other things, dependent on the selected bandwidth (Nyquist's theorem). In signal amplification unit 2 the scanned signals undergo processes, such as amplification, filtering, digitisation and multiplexing. For these purposes the unit 2 comprises common components, not represented in the figure, such as pre-amplifiers, bandfilters, analogue AGC controls, sampling switches, analogue-digital converters, digital AGC controls and multiplexers. The signal amplification unit provides digitised signals $s(k)$ (k = 1 ... 96), which represent the amplitude of the acoustic signals received per row.

The signals $s(k)$ are supplied to a beamforming unit 3 which operates in accordance with the well-known true time delay principle. The beamforming unit 3 delays signals $s(k)$ such that signals $s(\phi_i)$ (i = 1 ... 96) are formed, which represent the amplitude of the acoustic signals received in directions $\phi_i$. Here $\phi_i$ corresponds with an angle in a plane perpendicular to the cylinder axis of the acoustic array.

The beamforming unit 3 can also be embodied by a digital beamformer or by simply using hydrophones with direction-sensitive acoustic characteristics.

The signals $s(\phi_i)$ (i=1 ... 96) are supplied to a frequency analysis unit 4 which determines the frequency components $f_j$ (j ... n) of each signal $s(\phi_i)$. For this purpose the frequency analysis unit 4 comprises a 2048 points FFT unit, so that for a practical bandwidth of 10 kHz, a frequency resolution of approximately 4.88 Hz (10.000/2048) is obtained. The signals $s(\phi_i, f_j)$ (i=1 ... m, j=1 ... n) thus selected are sent to the data processing unit 5 with a repetition frequency of 0.2 and 1.2 Hz.

The given order of the frequency analysis unit 4 after the beamforming unit 3 is not the only feasible one. The units may also occur in inverted order.

The data processing unit 5 comprises a direction estimator unit 6, a background normalisation unit 7 and a detection unit 8.

The signals $s(\phi_i, f_j)$ with a repetition frequency of 1.2 Hz are sent to the direction estimator unit 6, which is suited to generate a broadband estimation $\Omega_{BB}$ of a direction $\Omega$ of an acoustic source on the basis of those signals. The estimation $\Omega_{BB}$ and a track number TNR and a confidence factor CF are sent to a general computer 9, which is suitable for, also on the basis of previous estimations, predicting the $\phi_{i=e}$ of the acoustic source. With the aid of this prediction $\phi_{i=e}$ the direction estimator unit 6 can, at a subsequent measuring time, select the signals of the most relevant directions $\phi_i$.

The signals $s(\phi_i, f_j)$ with a repetition frequency of 0.2 Hz are sent to the background normalisation unit 7, which for each frequency $f_j$, on the basis of the signals $s(\phi_i, f_j)$ (i=1 ... m) generates a background signal $s_N(f_j)$. This background signal is subtracted from the signals $s(\phi_i, f_j)$ in accordance with $s'(\phi_i, f_j) = s(\phi_i, f_j) - s_N(f_j)$.

The corrected signals $s'(\phi_i, f_j)$ thus obtained are sent to the detection unit 8, which, on the basis of a set detection level $s_D$, selects frequencies $f_j'$ of which the signals $s'(\phi_i, f_j)$ exceed this detection threshold. This information is supplied to the direction estimator unit 6 for the selection of suitable signals.

The actual background signals $s_N(f_j)$ are sent to an automatic gain control unit 21. This unit determines on the basis of the supplied signals $s_N(f_j)$ an AGC signal which controls the gain in the signal amplification means 2.

The corrected signals $s'(\phi_i, f_j)$ are also sent to known display units 10. These display units comprise the following elements, which are not depicted in the figure, such as memory units, integrators, means for image processing such as histogram equalisation and displays suitable to show e.g. the magnitude of $s'(\phi_i, f_j)$ as a function of $\phi_i$ and $f_j$, by means of colour or intensity. Other display modes are $s'(\phi_i, f_j)$ as a function of the frequency $f_j$ and an elapsed period of time $s'(\phi_i, f_j)$ as a function of the frequencies $f_j$ and $\phi_i$ as a function of the period of time elapsed. The display units 10 are also supplied by the general computer 9 with target trajectory data, which are found on the basis of the estimations $\Omega_{BB}$.

FIG. 2 shows the embodiment of the direction estimator unit 6 in greater detail. The signals $s(\phi_i, f_j)$ originating from the frequency analysis unit 4 are sent successively, for each time of measurement, to a first memory unit 11 and stored there. The data stored in this memory unit 11 can be selected and retrieved by a selection unit 12 in random order under DMA control. The memory unit 11 is fit to store signal values $s(\phi_i, f_j)$ for 96 beam directions and 1535 frequencies for each beam direction. These values are updated at a repetition frequency of 0.2 Hz.

The selection of data by the selection unit 12 is determined by the signals provided by the general computer 9. These signals contain information about an expected beam direction $\phi_{i=e}$ and a corresponding target trajectory number TNR. On the basis of the expected beam direction $\phi_{i=e}$ only signals from adjacent beam directions $\phi_{e\pm1} \ldots \phi_{e\pm8}$ are selected. As a beamwidth decreases in case of an increasing frequency for which the beamwidth has been defined, only the signals for the lower frequencies are selected from the beam directions which are more remote. For the beam directions $\phi_{e-2} \leq \phi_i \leq \phi_{e+2}$ the corresponding signals $s(\phi_i, f_j)$ for all frequencies $f_j$ from a minimal value $f_{min}$ up to a maximum value $f_{max}$, are selected. For the beam directions $\phi_{e\pm s}$ with s running from 3 to 8, only the corresponding signals for those frequencies $f_j$ running from $f_{min}$ to $f_{max}/\{(s-2)\sqrt{2}\}$, are selected. FIG. 3 illustrates this beamwidth-dependent frequency selection.

The beamwidth and the beamform are generally not only dependent on the frequency, but also on the position of the hydrophones and the actual beam direction. When placing the hydrophones in a cylindrical plane, the beamform will be independent of the beam direction. However, when the hydrophones are placed in e.g. a non-curved plane, the beamform will be dependent on the beam direction. In order to be able to apply the selection process mentioned above for that particular case in the way described, it is necessary to use a value of $\phi_i$ transformed via a certain function, instead of the beam direction $\phi_i$ itself. That function must be chosen in such a way that the beamwidth is independent of the function value and the beamform is symmetrical to the function value. In case the hydrophones are placed in a flat plane such as a linear array, the function is the sine of the angle of the beam direction with respect to the flat plane. In case the hydrophones are placed in a defined plane which is more complicated such as e.g. the curved body of a submarine, the function will be of a more complex form.

The selection unit 12 also selects signals $s(\phi_i, f_j)$ of which the frequencies $f_j$ correspond with the frequencies $f_j'$ selected by the detection unit 8.

The selected signals $s(\phi_i, f_j)$ are stored in a second memory unit 13, shown in FIG. 2. For each frequency $f_j$ stored in this unit 13 a narrowband estimation $\Omega_{NB}(f_j)$ (block 14) of the direction $\Omega$ of a source generating the acoustic signals is attempted. First of all it is checked whether, in the beam direction $\phi_i$ corresponding to a certain frequency $f_j$, a sufficiently sharp maximum in the signal values $s(\phi_i, f_j)$ concerned, occurs. Thereto the maximum signal $s(\phi_{i=p}, f_j)$ that occurs for the frequency $f_j$ is established first. Subsequently it is checked whether, for the same frequency $f_j$, amongst the signal values that are on either side of the beam direction $\phi_{i=p}$, a value is found that is a factor $\alpha(f_j)$, dependent upon the frequency $f_j$, lower than the signal value for $\phi_{i=p}$. See also FIG. 4 where a method is shown to estimate $X\Omega_{NB}(f_j)$. By linear interpolation the left and right values $\phi_L$ and $\phi_R$ of the corresponding directions, for level MAX$-\alpha(f_j)$, presented in FIG. 4, are established. Following that $\Omega_{NB}(f_j)$ is equated with the arithmetic average of $\phi_L$ and $\phi_R$.

A different method to make an estimation of $\Omega_{NB}(f_j)$ is shown in FIG. 5. Here a function similar to the beamform such as e.g. a parabola is fitted over the signal values in the most optimum way. The top of the parabola function then results in $\Omega_{NB}(f_j)$.

FIG. 6 gives an example of the possible signal values $s(\phi_i, f_j)$ as a function of $\phi_i$ and $f_j$ as they may be stored in the second memory unit 13. The figure shows a general increase of the signal values for decreasing frequencies as a result from a background level. Besides, in case of an expected beam direction $\phi_{i=e}$, an increase of the signal level as a result of an acoustic target can be distinguished for a number of frequencies, as well as a noise peak in case of the beam direction $\phi_{i=e-5}$. The frequencies $f_j$ for which a narrowband estimation $\Omega_{NB}(f_j)$ can be made which are presented in a schematic diagram. Whether a narrowband estimation can be made, is determined, apart from the occurrence of the sharp maximum mentioned earlier, by the frequencies $f_j'$ generated by the detection unit 8 illustrated in FIG. 1.

The estimations $\Omega_{NB}(f_j)$ are selected (block 14, FIG. 2) in classes $b_i$ arranged in order of increasing magnitude of $\Omega_{NB}$. The number of estimations $N_i$ per class $b_i$ is supplied, in conjunction with the corresponding class, to the memory unit 15 presented in FIG. 2. The estimations $\Omega_{NB}(f_j)$ are supplied to the display units 10 in conjunction with the corresponding frequency $f_j$.

Figure 8:
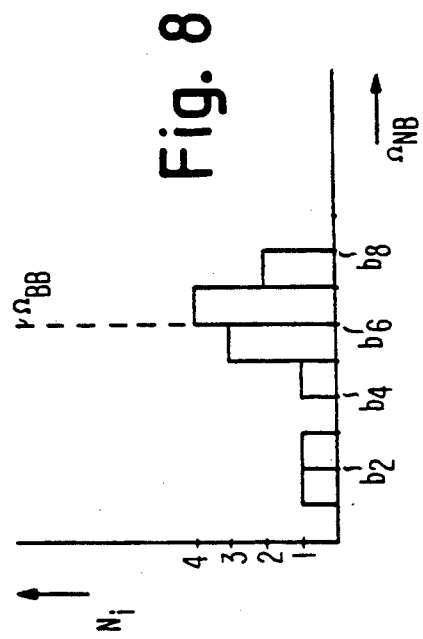
FIG. 8 illustrates a histogram of the narrowband estimations $\Omega_{NB}(f_j)$ of FIG. 7 for the purpose of the broadband estimations $\Omega_{BB}$.
Figure 7:
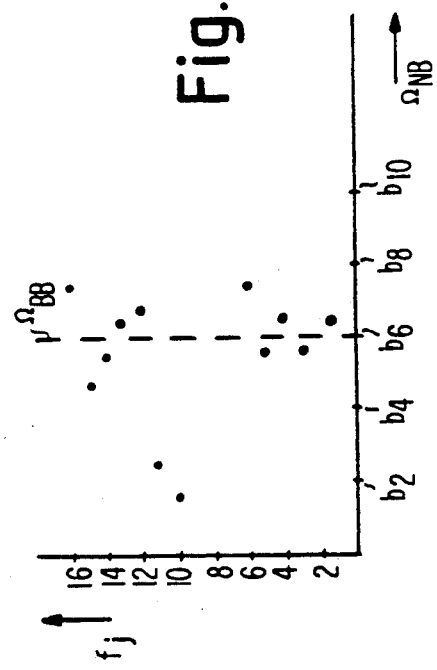
FIG. 7 illustrates the narrowband estimations $\Omega_{NB}(f_j)$ of FIG. 6.

FIG. 7 gives an example of the display of the estimations $\Omega_{NB}(f_j)$ on a display and FIG. 8 gives an example of a distribution of the number of estimations $N_i$ per class $b_i$ on the basis of the narrowband estimations of FIG. 7.

Subsequently, on the basis of the distribution $N_i$ versus $b_i$, stored in the memory unit 15 (FIG. 2), a median value $\Omega_{BB}$ is determined (block 16). In case of a total number of FS narrowband estimations the median $\Omega_{BB}$ is represented by:

$$\Omega_{BB} = b_k \text{ if } \sum_{i=1}^{i=k} N_i = FS/2 \text{ or}$$

$$\Omega_{BB} = b_k - \frac{FS/2 - \sum_{i=1}^{k} N_i}{\sum_{i=1}^{k-1} N_i - \sum_{i=1}^{k} N_i} \cdot (b_{k-1} - b_k) \text{ if}$$

$$\sum_{i=1}^{k} N_i < FS/2 < \sum_{i=1}^{k-1} N_i$$

where $b_k$ is the class k of the distribution $N_i$ versus $b_i$. A factor $\sigma_\Omega$ of the reliability of the median determination is presented by:

$$\sigma_\Omega = \sigma_{\Omega u} - \sigma_{\Omega d} \text{ where}$$

$$\sigma_{\Omega u/d} = b_k \text{ if } \sum_{i=1}^{i=k} N_i = N_{u/d} \text{ with}$$

$$N_u = \frac{FR}{100} \cdot FS \text{ and } N_d = \frac{100 - FR}{100} \cdot FS \text{ or}$$

$$\sigma_{\Omega u/d} = b_k + \frac{N_{u/d} - \sum_{i=1}^{k} N_i}{\sum_{i=1}^{k+1} N_i - \sum_{i=1}^{k} N_i} \cdot (b_{k-1} - b_k) \text{ if}$$

$$\sum_{i=1}^{k} N_i < N_{u/d} < \sum_{i=1}^{k+1} N_i$$

Here FR is an arbitrarily selected fraction of the total number of values FS. The median $\Omega_{BB}$ is now considered as a broadband estimation of $\Omega$ and is supplied to the general computer 9 with the corresponding confidence factor $\sigma\Omega$ and target trajectory number TNR.

For a subsequent target trajectory number TNR the contents of the memory units 13 and 15 is erased and then provided with new data by the data selection unit in the way described before.

Figure 9:
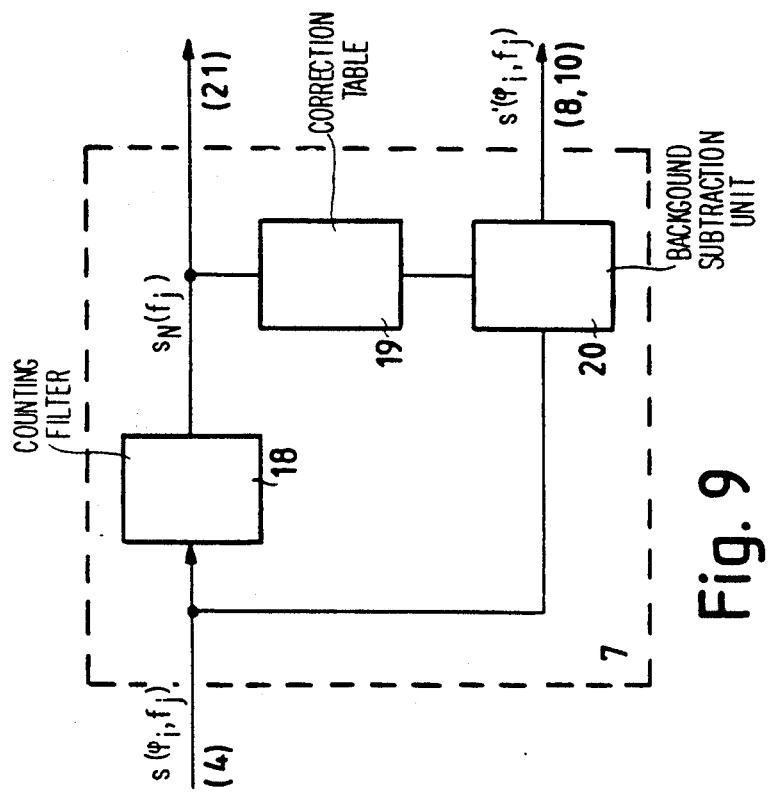
FIG. 9 illustrates an embodiment of a background normalisation unit of FIG. 12.
Figure 10:
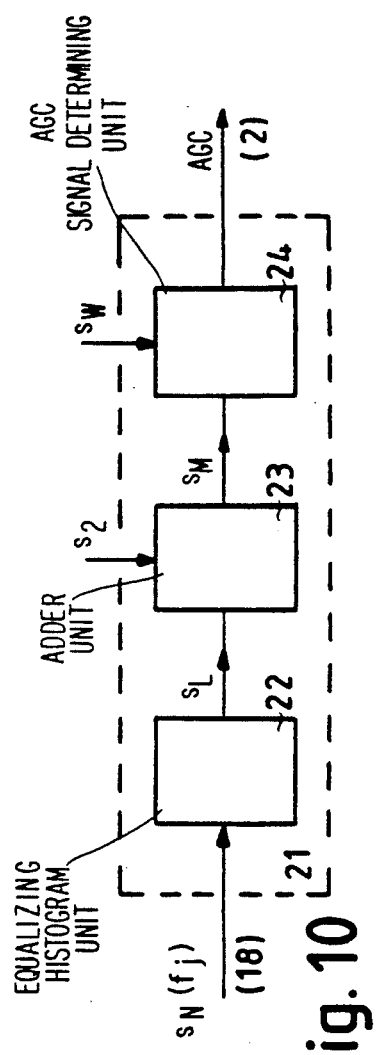
FIG. 10 illustrates an embodiment of an automatic gain control unit of FIG. 1.

FIG. 9 shows an embodiment of the background normalisation unit 7 of FIG. 1. The signals $s(\phi_i, f_j)$ generated with a repetition frequency of 1.2 Hz by the frequency analysis unit 4 are sent to a counting filter 18 which is available for each frequency $f_j$. Each counting filter 18 determines per frequency $f_j$, from the successively supplied signals $s(\phi_i, f_j)$ (i=1,...,h,...,m), the background level $s_N(f_j)$ for the frequency $f_j$ by calculating the median value of the m supplied signals. The output signal of the counting filter 18 corresponds with $s(\phi_h, f_j)$, where the value of h is raised by one step, remains equal or is lowered by one step, for each new signal $s(\phi_i, f_j)$ added to the counting filter, if the signal $s(\phi_i, f_j)$ is respectively larger, equal or smaller than the signal $s(\phi_h, f_j)$. After running in, $s(\phi_h, f_j)$ is equal to the median of $s(\phi_i, f_j)$ (i=1 ... m). This value is taken as the normalised background signal $s_N(f_j)$ and all signals $s_N(f_j)$ (j=1 ... n) as the normalised background spectrum. Once the signals for all n beam directions have been processed, the resulting signals $s_N(f_j)$ are stored in a correction table 19. With the aid of these stored values the background level is subtracted in unit 20 from the signals $s(\phi_i, f_j)$ in the way described before. The signals $s'(\phi_i, f_j)$ which have been corrected for the background level are sent to the display units 10 and the detection unit 8. The signals $s_N(f_j)$ (j=1 ... n) are also sent to an automatic gain control unit 21 illustrated in FIG. 10. By means of an equalising histogram (block 22) a level $s_L$ is determined with respect to these signals, to which applies that 30% of the signals has a lower value. By adding a constant value $s_2$ to $s_L$ (block 23) the so-called instantaneous level $s_M$ is obtained. This value is used in conjunction with a required signal level $s_W$ to determine an AGC signal (block 24), where the AGC signal is given at time t by:

$$AGC(t) = AGC(t - \Delta t) + STEP.$$

where $\Delta t$ is the length of time for which a new background spectrum $s_N(f_j)$ is generated and where STEP is a function of the difference between $s_L$ and $s_W$. The AGC signals thus obtained are sent to the signal amplification unit 2 shown in FIG. 1.

The embodiment of the data processing unit 5 described here can be realised in firmware by making use of commercially available microprocessors and memory elements.

I claim:

1. An acoustic detection device for receiving and processing acoustic signals, which comprises:
   k acoustic detectors for the detection and conversion of acoustic signals into electrical signals s(k);
   beamforming means and a frequency analysis unit which uses the signals s(k) to generate signals $s(\phi_i, f_j)$ which represent acoustic signals with n frequencies $f_j$ (j=1 ... n) received from m beam reception directions $\phi_i$ (i=1 ... m); and
   a data processing unit suitable for processing the signals $s(\phi_i, f_j)$;

characterised in that the data processing unit comprises a direction estimator unit which generates for each of the n frequencies $f_j (j=1 \ldots n)$, where a predetermined detection criterion set by the direction estimator unit is met, on the basis of at least a selection of the signals $s(\phi_i, f_j)$ $(i=1 \ldots m)$, corresponding to each frequency $f_j$ from the beam reception directions $\phi_i$, a narrowband estimation $\Omega_{NB}(f_j)$ of a direction $\Omega$ of an acoustic signals generating source and where subsequently the direction estimator unit, on the basis of the narrowband estimations $\Omega_{NB}(f_j)$, generated for at least a selection of the frequencies $f_j$, generates a broadband estimation $\Omega_{BB}$ of the direction $\Omega$.

2. An acoustic detection device as claimed in claim 1, characterised in that the direction estimator unit generates the broadband estimation $\Omega_{BB}$ on the basis of a median value of a frequency range of the values $\Omega_{NB}(f_j)$ arranged in order of magnitude.

3. An acoustic detection device as claimed in claim 2, characterised in that the direction estimator unit produces a confidence factor for $\Omega_{BB}$ on the basis of a distribution of the values $\Omega_{NB}(f_j)$ around the median value in the frequency range of $\Omega_{NB}(f_j)$.

4. An acoustic detection device as claimed in claim 1, 2 or 3 characterised in that the predetermined detection criterion for the frequency $f_j$ is met if one of the m signals $s(\phi_i, f_j)$ belonging to the frequency $f_j$, from m beam reception directions $\phi_i$ $(i=1 \ldots m)$ has a maximum value $s(\phi_{i=p}, f_j)$ with respect to the values of the $2q+1$ values arranged in order of magnitude $\phi_i$ signals $s(\phi_i, f_j)$ $(i=p-q, \ldots, p \ldots, p+q)$, at least one of the signals $s(\phi_i, f_j)$ $(p-q \leq i < p)$ and at least one of the q signals $s(\phi_i, f_j)$ $(p < i \leq p+q)$ has a value which has a value $\alpha(f_j)$ dependent on the frequency $f_j$ which is lower than the value of $s(\phi_{i=p}, f_j)$.

5. An acoustic detection device as claimed in claim 1, characterised in that the data processing unit comprises a background normalisation unit that generates for each of the n frequencies $f_j (j=1 \ldots n)$, on the basis of the m signals $s(\phi_i, f_j)$ from m beam reception directions $\phi_i (i=1 \ldots m)$ belonging to each frequency $f_j$, a background signal $s_N(f_j)$, and subtracts the signals $s_N(f_j)$ from the signals $s(\phi_i, f_j)$ in accordance with $s'(\phi_i, f_j) = s(\phi_i, f_j) - s_N(f_j)$ $(i=1 \ldots m, j=1 \ldots n)$.

6. An acoustic detection device as claimed in claim 5, characterised in that the background normalization unit generates the background signal $s_N(f_j)$ on the basis of a median value of a frequency distribution of signal levels arranged in order of values of the signals $s(\phi_i, f_j)$ belonging to the frequency $f_j$, from m beam reception directions $\phi_i (i=1 \ldots m)$.

7. An acoustic detection device as claimed in claim 5 or 6, characterised in that the direction estimator unit includes a detection unit which, on the basis of the signals $s'(\phi_i, f_j)$ supplied to the detection unit and with the aid of a set signal detection level $s_D$, selects signals with frequencies $f_j'$ for which the corresponding signal $s'(\phi_i, f_j')$ exceeds detection level $s_D$.

8. An acoustic detection device as claimed in claim 7, characterised in that the device comprises an automatic gain control unit, which generates an automatic gain control (AGC) signal on the basis of the background signals $S_N(f_j)$ generated per frequency $f_j (j=1 \ldots n)$ and where the AGC signal is supplied to the signal amplification means, connected with the acoustic detectors.

9. An acoustic detection device as claimed in claim 8, characterised in that the automatic gain control unit generates the AGC signal on the basis of a signal level obtained after a histogram equilisation of the background signals $s_N(f_j)$ $(j=1 \ldots n)$ ordered in magnitude of signal level.

10. An acoustic detection device as claimed in claim 9, characterised in that the direction estimator unit supplies the signals $s'(\phi_i, f_j)$ to a display unit suitable for display of $s'(\phi_i, f_j)$ as a function of one or more of the quantities $\phi_i$, $f_j$ and an elapsed period of time.

11. An acoustic detection device as claimed in claim 1, 2 or 3, characterised in that the direction estimator unit produces the estimation of $\Omega_{NB}(f_j)$ on the basis of signals $s(\phi_i, f_j)$, selected according to a frequency $f_j = f_j''$, where a maximally occurring value of the frequency $f_j''$ becomes increasingly smaller as the beam direction $\phi_i$ differs more and more from a beam direction $\phi_{i=e}$ which most resembles $\Omega$.

12. An acoustic detection device as claimed in claim 11, characterised in that the following applies to the frequencies $f_j''$ of the selected signals $s(\phi_i, f_j)$:

$$f_{min} < f_j'' < f_{max} \text{ if } \phi_{e-r} \leq \phi_i \leq \phi_{e-r}$$

and $$f_{min} < f_j'' < \frac{f_{max}}{(s-r)\sqrt{2}} \text{ if } \phi_i = \phi_{e \pm s}, (s = r-1, r-2, \ldots)$$

where $f_{min}$ and $f_{max}$ are respectively a lowest and highest occuring value respectively of the frequency $f_j$.

13. An acoustic detection device as claimed in claim 1, 2 or 3, characterised in that the direction estimator unit supplies at least one of the signals $\Omega_{NB}(f_j)$ and $\Omega_{BB}$ to a display unit suitable for display as a function of one or more of the quantities $f_j$, $\phi_i$ and an elapsed period of time.

14. An acoustic detection device as claimed in claim 1, 2 or 3, characterised in that the direction estimator unit comprises means for applying a transformation function to each direction $\phi_i$ to represent an angle related to the beam reception direction in $\phi_i$, where a beamwidth expressed in $\phi_i$ is virtually independent of a magnitude of the angle and a beamform, determined by a beam sensitivity as a function of $\phi_i$, is of a virtually symmetric form.

15. An acoustic detection device as claimed in claim 14, characterised in that the acoustic detectors are arranged in a straight line and that the transformation function is a sine of an angle in a plane through the straight line and with respect to the straight line.

* * * * *